United States Patent
Park

(10) Patent No.: US 8,347,331 B2
(45) Date of Patent: *Jan. 1, 2013

(54) METHOD OF ACQUIRING PROGRAM GUIDE INFORMATION, PROGRAM GUIDE METHOD APPROPRIATE FOR THE SAME, AND PROGRAM GUIDE APPARATUS

(75) Inventor: Ju-ha Park, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,878

(22) Filed: Jun. 24, 2010

(65) Prior Publication Data

US 2010/0257558 A1  Oct. 7, 2010

Related U.S. Application Data

(63) Continuation of application No. 09/163,977, filed on Sep. 30, 1998.

(30) Foreign Application Priority Data

Sep. 5, 1998 (KR) .................................. 98-36628

(51) Int. Cl.
  *G06F 3/00* (2006.01)
  *G06F 13/00* (2006.01)
  *H04N 5/445* (2011.01)
(52) U.S. Cl. .................. 725/39; 725/50; 725/56
(58) Field of Classification Search .......... 725/39
  See application file for complete search history.

(56) References Cited

U.S. PATENT DOCUMENTS

| | | | | |
|---|---|---|---|---|
| 4,484,217 A | * | 11/1984 | Block et al. | 725/1 |
| 5,444,499 A | | 8/1995 | Saitoh | |
| 5,583,889 A | * | 12/1996 | Citta et al. | 375/341 |
| 5,585,838 A | * | 12/1996 | Lawler et al. | 725/54 |
| 5,625,406 A | * | 4/1997 | Newberry et al. | 725/54 |

(Continued)

FOREIGN PATENT DOCUMENTS

JP  4-77110  3/1992

(Continued)

OTHER PUBLICATIONS

U.S. Appl. No. 12/834,436, Jul. 12, 2010, Ju-Ha Park, Samsung Electronics Co., Ltd.

(Continued)

*Primary Examiner* — Robert Hance
(74) *Attorney, Agent, or Firm* — Staas & Halsey LLP

(57) ABSTRACT

A method of acquiring program guide information for a digital television receiver, and program guide method, are provided. A method of channel searching for a digital television receiver, comprising: receiving a digital television transport stream (TS) which includes audio, video, and program information; extracting the program information from the received TS; storing the extracted program information in a storage; accessing the storage to generate a channel list based on the stored program information, wherein the channel list comprises at least one channel number and the at least one channel number comprises at least one main channel number; and navigating the channel list to search a channel number, wherein when the at least one main channel number has at least one corresponding sub-channel number, the sub-channel number can be listed after the at least one main channel number.

10 Claims, 5 Drawing Sheets

U.S. PATENT DOCUMENTS

| | | | |
|---|---|---|---|
| 5,659,367 A | | 8/1997 | Yuen |
| 5,699,125 A | | 12/1997 | Rzeszewski et al. |
| 5,737,030 A | * | 4/1998 | Hong et al. ............... 725/41 |
| 5,781,246 A | | 7/1998 | Alten et al. |
| 5,793,438 A | | 8/1998 | Bedard |
| 5,844,620 A | | 12/1998 | Coleman et al. |
| 5,880,768 A | | 3/1999 | Lemmons et al. |
| 5,917,481 A | | 6/1999 | Rzeszewski et al. |
| 5,929,932 A | | 7/1999 | Otsuki et al. |
| 5,946,052 A | | 8/1999 | Ozkan et al. |
| 6,020,930 A | | 2/2000 | Legrand |
| 6,025,837 A | | 2/2000 | Matthews, III et al. |
| 6,031,577 A | * | 2/2000 | Ozkan et al. ............... 348/465 |
| 6,034,677 A | * | 3/2000 | Noguchi et al. ............ 715/719 |
| 6,078,348 A | | 6/2000 | Klosterman et al. |
| 6,212,680 B1 | | 4/2001 | Tsinberg et al. |
| 6,216,265 B1 | | 4/2001 | Roop et al. |
| 6,243,142 B1 | | 6/2001 | Mugura et al. |
| 6,337,719 B1 | | 1/2002 | Cuccia |
| 6,341,195 B1 | | 1/2002 | Mankovitz et al. |
| 6,405,372 B1 | | 6/2002 | Kim et al. |
| 6,418,556 B1 | | 7/2002 | Bennington et al. |
| 6,421,828 B1 | | 7/2002 | Wakisaka et al. |
| 6,452,644 B1 | | 9/2002 | Shimakawa et al. |
| 6,483,547 B1 | * | 11/2002 | Eyer ............... 348/473 |
| 6,763,522 B1 | * | 7/2004 | Kondo et al. ............ 725/39 |
| 7,051,353 B2 | | 5/2006 | Yamashita et al. |
| 2003/0090585 A1 | | 5/2003 | Anderson |

FOREIGN PATENT DOCUMENTS

| | | |
|---|---|---|
| JP | 7-67061 | 3/1992 |
| JP | 4-355583 | 12/1992 |
| JP | 6-311444 | 11/1994 |
| JP | 07-303216 | 11/1995 |
| JP | 09-083888 | 3/1997 |
| JP | 9-331484 | 12/1997 |
| JP | 10-13756 | 1/1998 |
| JP | 10-013758 * | 1/1998 |
| JP | 10-13758 | 1/1998 |
| JP | 10-84513 | 3/1998 |
| JP | 10-108144 | 4/1998 |
| JP | 10-112825 | 4/1998 |
| JP | 10-150642 | 6/1998 |
| JP | 10-178621 | 6/1998 |
| WO | WO 96/07270 A1 | 3/1996 |
| WO | WO 97/30552 | 8/1997 |

OTHER PUBLICATIONS

U.S. Office Action mailed Jul. 21, 2010 in related U.S. Appl. No. 09/163,977.
U.S. Appl. No. 09/163,977, filed Sep. 30, 1998, Ju-Ha Park, Samsung Electronics Co., Ltd.
U.S. Appl. No. 10/898,966, filed Jul. 27, 2004, Ju-Ha Park, Samsung Electronics Co., Ltd.
Japanese Office Action issued on Dec. 7, 2004 in corresponding Japanese Application No. 2003-11056.
Japanese Office Action issued on May 9, 2006 in corresponding Japanese Application No. 2003-11056.
U.S. Patent Office Action dated Mar. 17, 2000, issued in corresponding U.S. Appl. No. 09/163,977.
U.S. Patent Office Action dated Aug. 29, 2000, issued in corresponding U.S. Appl. No. 09/163,977.
U.S. Patent Advisory Action dated Jan. 17, 2001, issued in corresponding U.S. Appl. No. 09/163,977.
U.S. Patent Office Action dated Feb. 13, 2001, issued in corresponding U.S. Appl. No. 09/163,977.
U.S. Patent Office Action dated Jun. 6, 2001, issued in corresponding U.S. Appl. No. 09/163,977.
U.S. Patent Office Action dated Jul. 30, 2002, issued in corresponding U.S. Appl. No. 09/163,977.
U.S. Patent Office Action dated Jan. 15, 2003, issued in corresponding U.S. Appl. No. 09/163,977.
U.S. Patent Office Action dated Jul. 1, 2003, issued in corresponding U.S. Appl. No. 09/163,977.
U.S. Patent Advisory Action dated Oct. 21, 2003, issued in corresponding U.S. Appl. No. 09/163,977.
U.S. Patent Office Action dated Dec. 5, 2003, issued in corresponding U.S. Appl. No. 09/163,977.
U.S. Patent Office Action dated May 19, 2004, issued in corresponding U.S. Appl. No. 09/163,977.
U.S. Patent Advisory Action dated Nov. 3, 2004, issued in corresponding U.S. Appl. No. 09/163,977.
U.S. Patent Office Action dated Feb. 25, 2005, issued in corresponding U.S. Appl. No. 09/163,977.
U.S. Patent Office Action dated Aug. 10, 2005, issued in corresponding U.S. Appl. No. 09/163,977.
U.S. Patent Advisory Action dated Nov. 29, 2005, issued in corresponding U.S. Appl. No. 09/163,977.
U.S. Patent Office Action dated Jan. 12, 2006, issued in corresponding U.S. Appl. No. 09/163,977.
U.S. Patent Office Action dated Jun. 14, 2006, issued in corresponding U.S. Appl. No. 09/163,977.
U.S. Patent Advisory Action dated Sep. 26, 2006, issued in corresponding U.S. Appl. No. 09/163,977.
U.S. Patent Office Action dated Dec. 28, 2006, issued in corresponding U.S. Appl. No. 09/163,977.
U.S. Patent Office Action dated Jun. 20, 2007, issued in corresponding U.S. Appl. No. 09/163,977.
U.S. Patent Advisory Action dated Sep. 4, 2007, issued in corresponding U.S. Appl. No. 09/163,977.
U.S. Patent Office Action Oct. 31, 2007, issued in corresponding U.S. Appl. No. 09/163,977.
U.S. Patent Office Action dated May 1, 2008, issued in corresponding U.S. Appl. No. 09/163,977.
U.S. Patent Interview Summary dated Jul. 14, 2008, issued in corresponding U.S. Appl. No. 09/163,977.
U.S. Patent Advisory Action dated Jul. 17, 2008, issued in corresponding U.S. Appl. No. 09/163,977.
U.S. Patent Office Action dated Oct. 16, 2008, issued in corresponding U.S. Appl. No. 09/163,977.
U.S. Patent Office Action dated Apr. 16, 2009, 2004, issued in corresponding U.S. Appl. No. 09/163,977.
U.S. Patent Advisory Action dated Jul. 6, 2009, issued in corresponding U.S. Appl. No. 09/163,977.
U.S. Patent Office Action dated Oct. 1, 2009, issued in corresponding U.S. Appl. No. 09/163,977.
U.S. Patent Office Action dated Mar. 19, 2010, issued in corresponding U.S. Appl. No. 09/163,977.
U.S. Patent Advisory Action dated Jun. 16, 2010, issued in corresponding U.S. Appl. No. 09/163,977.
U.S. Patent Office Action dated Feb. 24, 2009, issued in corresponding U.S. Appl. No. 10/898,966.
U.S. Patent Office Action dated Sep. 1, 2009, issued in corresponding U.S. Appl. No. 10/898,966.
U.S. Patent Advisory Action dated Nov. 20, 2009, issued in corresponding U.S. Appl. No. 10/898,966.
U.S. Patent Office Action dated Jan. 6, 2010, issued in corresponding U.S. Appl. No. 10/898,966.
U.S. Patent Advisory Action dated Mar. 23, 2010, issued in corresponding U.S. Appl. No. 10/898,966.
U.S. Patent Office Action dated May 26, 2010, issued in corresponding U.S. Appl. No. 10/898,966.
U.S. Patent Office Action dated Sep. 9, 2010, issued in corresponding U.S. Appl. No. 12/834,436.
U.S. Patent Office Action Interview Summary dated Sep. 22, 2010, issued in corresponding U.S. Appl. No. 12/834,436.
U.S. Patent Office Action dated Feb. 1, 2011, issued in corresponding U.S. Appl. No. 12/834,436.
U.S. Office Action dated Apr. 13, 2011, issued in the file history of U.S. Patent Application No. 9/163,977.
U.S. Office Action dated Jul. 19, 2011, issued in the file history of U.S. Appl. No. 09/163,977.
U.S. Office Action dated Jul. 18, 2011 issued in the file history of U.S. Appl. No. 10/898,966.

U.S. Office Action dated Sep. 12, 2011, issued in the file history of U.S. Appl. No. 12/834,436.
U.S. Patent Final Office Action mailed Jan. 26, 2012 in U.S. Appl. No. 11/898,966.

Japanese Office Action dated Feb. 14, 2012 issued in corresponding Japanese Patent Application No. 2010-10019.

* cited by examiner

METHOD OF ACQUIRING PROGRAM GUIDE INFORMATION, PROGRAM GUIDE METHOD APPROPRIATE FOR THE SAME, AND PROGRAM GUIDE APPARATUS

CROSS-REFERENCE TO RELATED APPLICATIONS

This application is a continuation application of application Ser. No. 09/163,977, filed Sep. 30, 1998 which is now pending. This application claims the benefit of Korean Application No. 98-36628, filed Sep. 5, 1998, in the Korean Industrial Property Office, the disclosures of all of which are incorporated herein by reference.

BACKGROUND

1. Field

The present invention relates to a method of acquiring program guide information in an image signal receiving apparatus, and a method and apparatus for guiding a program using the same.

2. Description of the Related Art

Generally, program information of a conventional analog TV broadcast is supplied to publications such as newspapers, TVs, magazines, etc. However, in a digital multichannel broadcast, tens to hundreds of channels are provided, so that a selection scope of viewers becomes wider and simultaneously program selection is significantly complicated.

In such a digital broadcast, an electronic program guide (EPG) providing a program list or information on the content of each program is being introduced as a fundamental data service.

Current EPG information is transmitted per channel. That is, since the EPG information of a corresponding channel is transmitted per channel, it is difficult to obtain the EPG information of all channels capable of being accessed.

To be more specific, the EPG information of a current received channel can be obtained by interpreting control information included in a transport packet received. However, in order to acquire EPG information of all channels capable of being accessed, a user must tune all channels individually.

In the digital broadcast, many more channels are provided than in the analog broadcast, and each channel can include subchannels. Therefore, it is important to swiftly interface the EPG information of each channel to a user.

SUMMARY

An aspect of embodiment, a method of acquiring useful EPG information is provided.

An aspect of embodiment, there is provided a method of channel searching for a digital television receiver, including: receiving a digital television transport stream (TS) which includes audio, video, and program information; extracting the program information from the received TS; storing the extracted program information in a storage; accessing the storage to generate a channel list based on the stored program information, wherein the channel list comprises at least one channel number and the at least one channel number comprises at least one main channel number; and navigating the channel list to search a channel number, wherein when the at least the one main channel number has at least one corresponding sub-channel number, the sub-channel number can be listed after the at least one main channel number.

An embodiment, the channel list can be accessed according to a listing sequence comprising main channel numbers and respective sub-channel numbers. Also, the program information can be navigated using a program specific information.

According to further embodiment, the listing sequence can be determined based on proximity between main channel numbers to allow the main channel number to be listed with at least one upper close channel number or at least one lower close channel number.

According to another embodiment, there is provided converting an IF signal from a tuner of the receiver into a baseband signal; and channel decoding the baseband signal to reconstruct a transport stream (TS).

An aspect of embodiment, the channel list can be accessed according to a listing sequence comprising main channel numbers and respective sub-channel numbers.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF EMBODIMENTS

Channel numbers, channel names, program names, schedules, etc. generally transmitted as data are displayed on a TV screen as a program list having a time axis and a channel axis by EPG software of a receiver. A user can perform operations such as tuning or programming in the program list by manipulating a cursor.

Figure 1:
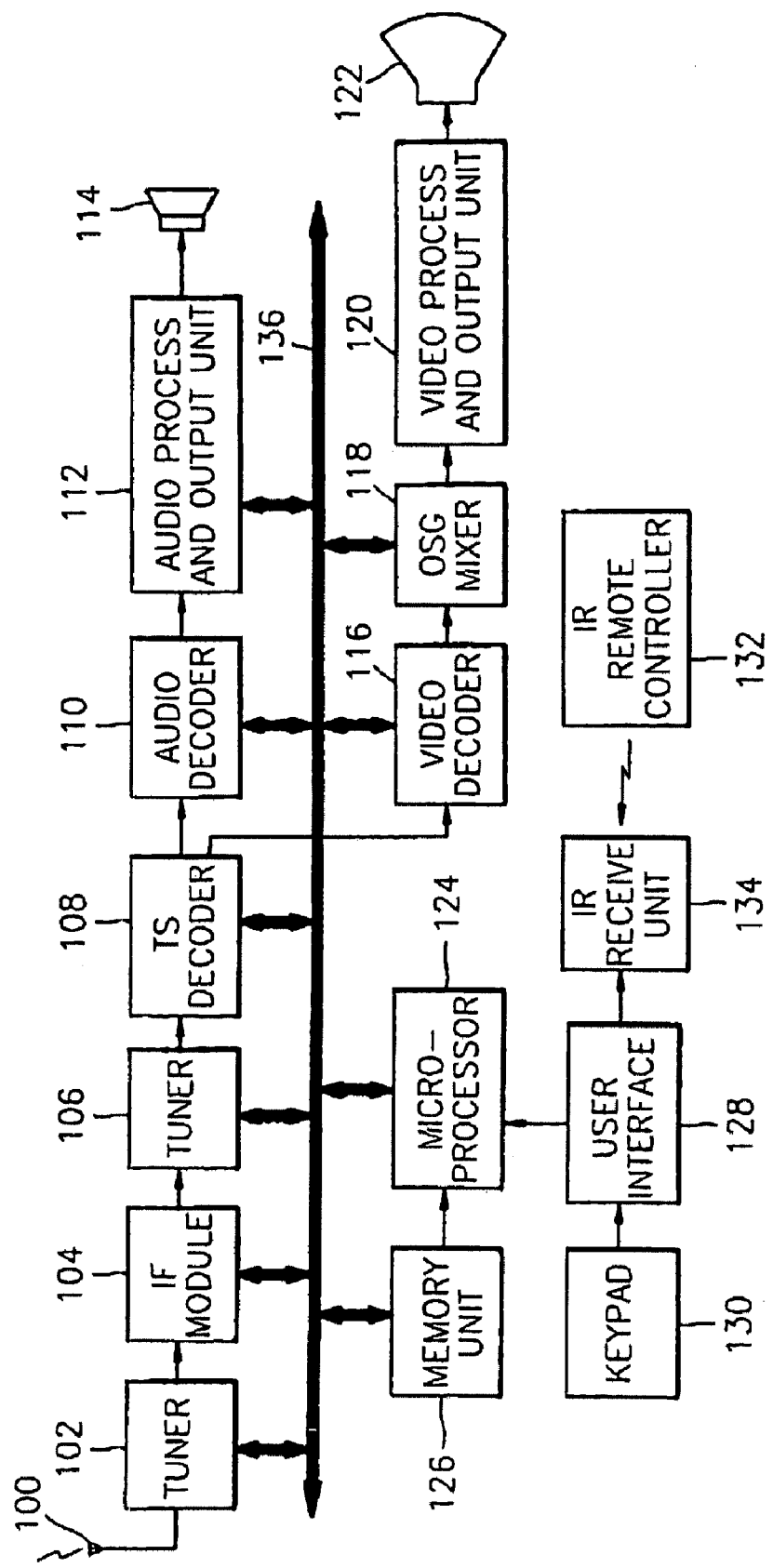
FIG. 1 is a block diagram illustrating the configuration of a general DTV receiver.

FIG. 1 is a block diagram showing the configuration of a conventional digital multichannel TV (hereinafter, called "DTV") receiver. In FIG. 1, a tuner 102 tunes a radio frequency (RF) channel from received broadcast signals via an antenna 100 under the control of a microprocessor 124. The tuner 102 outputs an intermediate frequency (IF) signal of the tuned channel, and an IF module 104 outputs a baseband signal of the tuned channel to a channel decoder 106.

The channel decoder 106 channel decodes the baseband signal received from the IF module 104 and reproduces data bit lines. Each of the reproduced data bit lines is divided into audio data, video data, and additional data by a transport stream (TS) decoder 108.

The audio data is applied to an audio decoder 110 and decoded according to an MPEG standard or dolby AC-3 standard by the audio decoder 110. The audio data is processed by an audio processing and output unit 112 and output as sound through a speaker 114.

The video data is applied to a video decoder 116, decoded according to the MPEG standard, applied to an on-screen-display (OSD) mixer 118, mixed with OSD data generated by the microprocessor 124, processed by a video processing and outputting unit 120, and output on the screen of a picture tube 122. Here, the OSD data is used for the microprocessor 124 to display various information as graphics or text on a screen.

The additional data is applied to the microprocessor 124. The microprocessor 124 extracts program guide information or other information and stores the extracted information in a memory unit 126. Typical EPG information is stored in a nonvolatile memory such as an EEPROM or a flash ROM.

A key pad 130 and an infra red (IF) receiving unit 134 are connected to the microprocessor 124 which is a control unit of a DTV receiver, via a user interface 128. The microprocessor 124 performs operations depending on various operation commands received from an IR remote controller 132 via the keypad 130 and the IR receiving unit 134, according to a program stored in the memory 126. Here, the IR remote controller 132 can be a wireless mouse such as an air mouse, a remote controller, etc.

A command from the IR remote controller is received as an IR signal by the IR receiving unit 134, and applied to the microprocessor 124 via the user interface 128. Also, the additional data from the TS decoder 108 is applied to the microprocessor 124. Here, the additional data includes program specific information (PSI) as a table with respect to program associated information prescribed in MPEG-2, and the aforementioned EPG information.

The memory unit 126 includes a ROM for storing the program of the microprocessor 124, a RAM for temporarily storing data created during the program execution in the microprocessor 124, and an electrically erasable and programmable ROM (EEPROM) for storing various reference data.

The microprocessor 124 is connected via a bus 136 to the tuner 102, the IF module 104, the channel decoder 106, the TS decoder 108, the audio decoder 110, the audio processing and outputting unit 112, the video decoder 116, the OSD mixer 118, the video process and output unit 120, and the memory unit 126.

In the apparatus shown in FIG. 1, while a user selects and receives a channel, the microprocessor 124 detects EPG information from the additional data provided by the TS decoder 108. EPG information of a corresponding channel is stored in the memory unit 126, and provided to a user in a program guide mode.

Since the EPG information is transmitted separately for each channel, EPG information of a corresponding channel cannot be acquired if that channel is not tuned.

Thus, a program list for all channels cannot be provided in the program guise mode for guiding a program list for each channel to a user.

In the present invention, while a program of a channel tuned by the tuner 102 is not displayed, for example, while a user selects or programs a program with reference to EPG information displayed on a screen or views line input, an accessible channel is scanned in a background operation, to obtain the EPG information.

Figure 2:
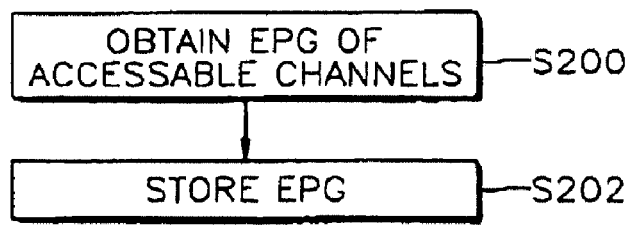
FIG. 2 is a flowchart illustrating a method of acquiring program guide information, according to the present invention.

FIG. 2 is a flowchart showing a method of obtaining program guide information according to the present invention, which shows an example of obtaining EPG information in a program guide mode When a program guide command is input from a user via the keypad 130, the apparatus shown in FIG. 1 enters into a program guide mode. In the program guide mode, first, all channels capable of being accessed by the tuner 102 are scanned to obtain program guide information for each channel, in step S200. The microprocessor 124 controls the tuner 102 to scan as many channels as possible, and detects the program guide information for each channel from additional data introduced via the tuner 102. Here, the accessible channels include not only the channels capable of being accessed by the tuner 102 but also line input.

Obtained EPG information is stored, in step S202.

The obtained EPG information is stored in the memory unit 126. The EPG information is transmitted for each channel, so that the microprocessor 124 acquires EPG information of a corresponding channel whenever a channel is changed and stores the acquired EPG information to the memory unit 126.

According to the method of FIG. 2, when the program guide mode begins, program guide information with respect to all the accessible channels is acquired all at once in an initial stage. Thus, it takes a lot of time to display the program guide information.

An increase in the number of accessible channels requires a longer time to display the program guide information, and causes the user inconvenience. In particular, a digital broadcast provides tens or hundreds of channels, thus requiring a lot of time to acquire the EPG information of all channels.

To solve this problem, in the present invention, the EPG information of a prior channel among prioritized channels is obtained first of all, and the EPG information of a channel having the lowest priority is then obtained, thereby accomplishing smooth user interface.

The priority of channel search is determined by the distance (interval) between channels tuned before a program guide command is applied, or by a probability distribution of channels, i.e., the accumulation of the number of times which channels are selected.

A typical user searches using a channel up/down command, so it is natural for the user to search from channels included in a currently-displayed program list and their close channels.

Here, the close channels include upper close channels and lower close channels, and it is preferable to determine by default which channel among the above close channels is to be accessed first.

Also, it is necessary to change the direction of search according to the characteristics of a user, even if the search direction is determined by default. For example, even if the default search direction is set to be upward, once the user designates a channel down button, lower channels must be preferentially searched. It is preferable that in preparation for when a user changes the search direction in the middle, a channel search direction is determined referring to a channel up/down command or page up/down command received just before determining a search channel.

Figure 3:
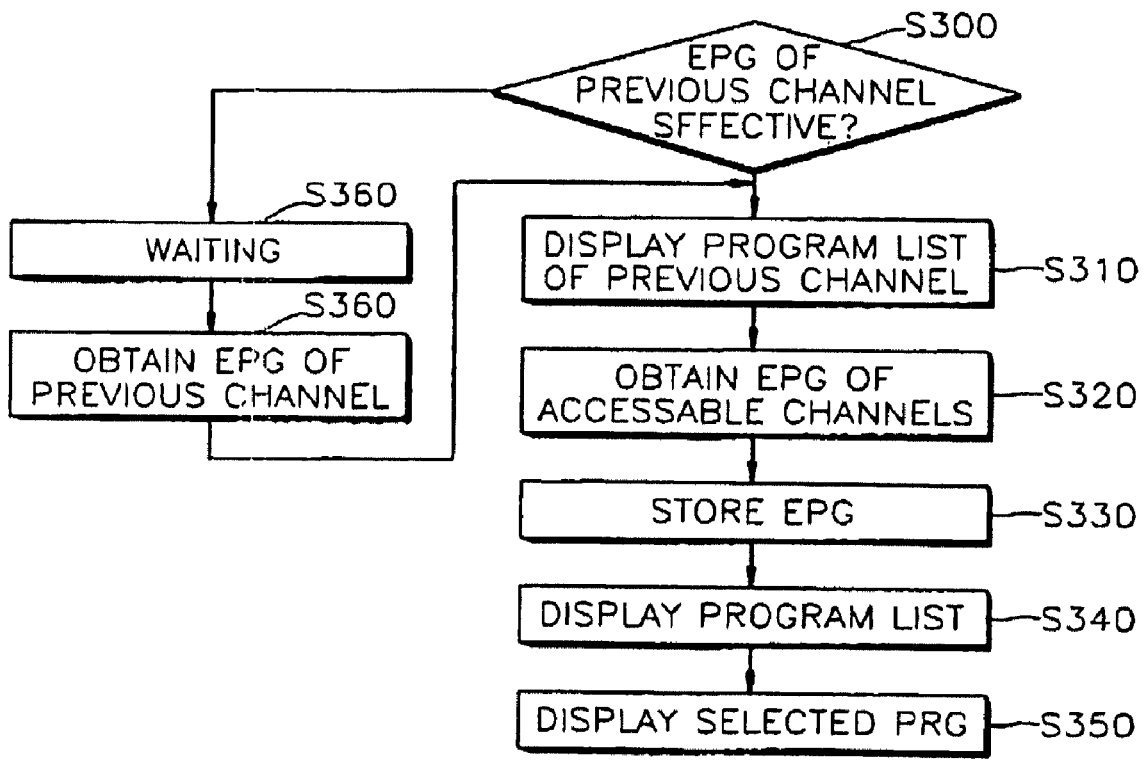
FIG. 3 is a flowchart illustrating a program guide method according to the present invention.

FIG. 3 is a flowchart illustrating a program guide method according to a preferred embodiment of the present invention. Response must be preferentially considered in the interface with a user. It is considered that good response is provided if a system quickly responds to a command input by a user. The response is not considered good if a user must wait until program guide information for all channels is obtained after inputting the program guide command.

However, the user immediately needs a channel viewed before the program guide command is applied, and program guide information of several channels adjacent to the channel viewed, not the program guide information for all channels.

In the present invention, the channel viewed before the program guide command is applied, and the program guide information of several channels adjacent to the above channel are acquired first of all and displayed to the user, thereby improving the response.

Also, channels adjacent to channels displayed in preparation for the channel search by a user are first searched, and far channels are then gradually searched, thus obtaining the program guide information on accessible channels.

First, it is detected whether program guide information of a channel tuned before a program guide command is applied is effective, in step S300.

Generally, a user applies a program guide command while receiving the program of a channel. The EPG information of a channel is automatically obtained while that channel is tuned, so that at least the program guide information of the channel tuned before the program guide command is applied can be considered effective.

In a display step S310, at least a program list of channels tuned before the program guide command is applied among stored EPG information is displayed. The microprocessor 124 writes a program list including channels tuned before the program guide command is applied among EPG information stored in the memory unit 126, and provides the program list to the OSG mixer 118. The OSG mixer 118 converts the program list provided by the microprocessor 124 into a character signal, and displays the character signal on a screen.

Figure 4A:
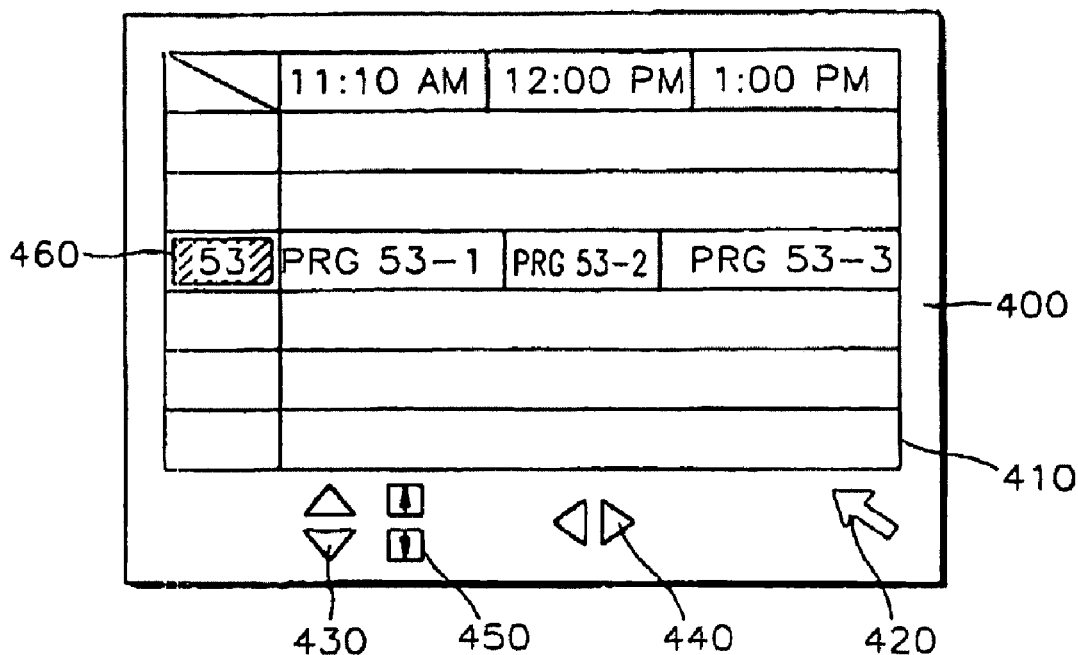
FIGS. 4A through 4C show a program list displayed on a screen in the method shown in FIG. 3.

FIG. 4A shows the contents displayed on a screen as the result of the step S310. In FIG. 4A, reference numeral 400 is a screen, reference numeral 410 is a program list, reference numeral 420 is a cursor, reference numeral 430 is an up/down button, reference numeral 432 is a page up/down button, and reference numeral 440 is a left/right scan button.

The program list 410 lists a program for each channel on channel and time axes. Channels listed in the program list 410 are controlled by the up/down button 430, and time is controlled by the left/right scan button 440.

A user can search for a channel and time of a desired program, using the up/down button 430 and the left/right scan button 440.

Whenever the up/down button 430 is pressed, a selection bar 460 moves between the listed channels. When the selection bar 460 departs from a screen boundary, the content of the program list 410 is renewed so that the next adjacent channel can be displayed.

If program guide information of channels tuned before the program guide command is applied is not effective or not stored, a screen display message like "please wait" or "obtaining program guide information" is displayed to the user, in step S360. If it takes a short time to obtain the program guide information of the tuned channel, this message display step may be omitted.

Then, program guide information of channels tuned before a program guide command is applied is obtained, in step S360. A program list including this program guide information is displayed, in step 310.

In a program guide information acquiring step S320, program guide information for each channel is obtained by scanning accessible channels via the tuner 102 while a user views displayed EPG information.

To be more specific, in the program list shown in FIG. 4A, an inverted channel number in a program list 360 of a channel No. 53 indicates that channel No. 53 was viewed before a program guide mode.

In the circumstances where the program list as shown in FIG. 4A is displayed, channels are searched to obtain EPG information, in the following sequence.

If a channel No. 52 and a channel No. 54 are channels listed closest to a channel No. 53, i.e., channels most adjacent, they have the highest preference.

If a channel No. 51 and a channel No. 56 are channels listed next closest to the channel No. 53, they have the next highest preferences after the channels No. 52 and No. 54.

If an upward search direction is determined by default, channels are searched for in the sequence of No. 53, to No. 52, to No. 54, No. 51, and No. 56.

Figure 4B:
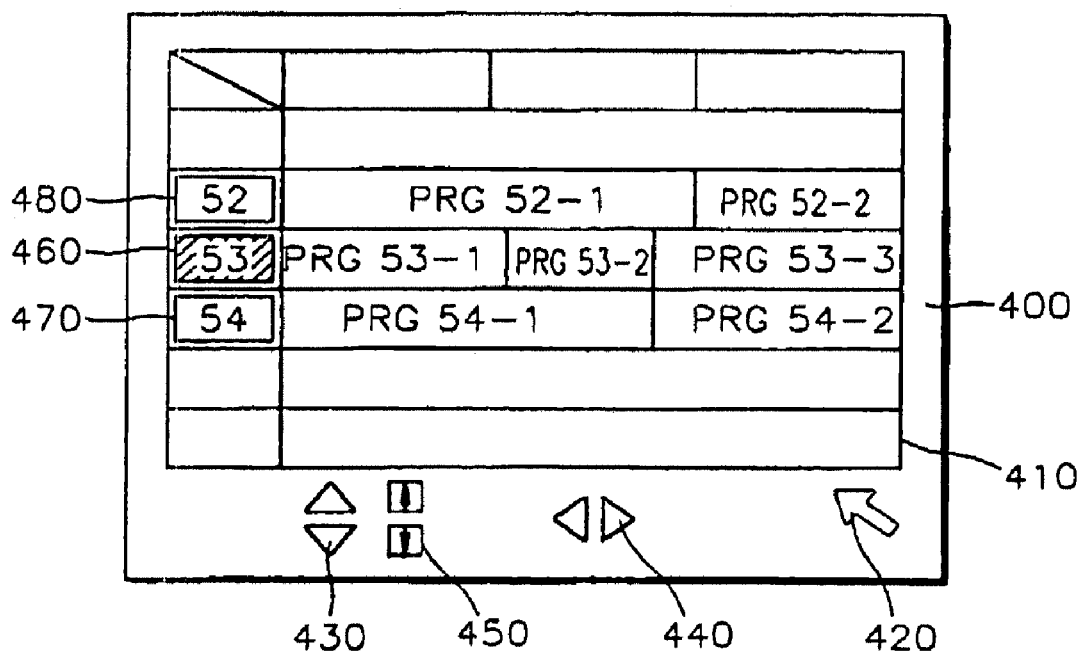
Figure 4C:
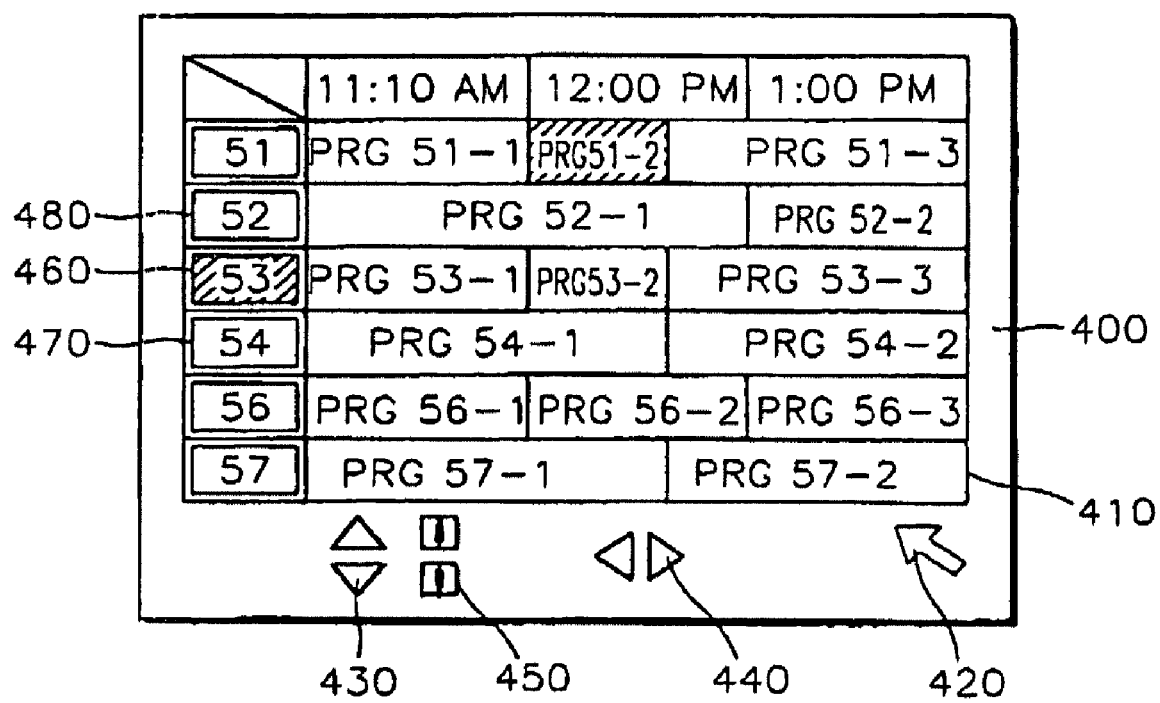

EPG information for each channel is stored in the memory unit 126 as soon as it is obtained, and the microprocessor 124 writes a new program list referring to this information and provides the new program to the OSG mixer 118, in steps S330 and S340. As a result, new program lists as shown in FIGS. 4B and 4C are sequentially displayed.

The sequence in which the EPG information is listed in the memory unit 126 is determined by a typical channel number. Also, when a channel has subchannels, the subchannels are listed after the main channel.

Accordingly, the microprocessor 124 already knows the listing sequence of the EPG information stored in the memory unit 126, and also knows the channel viewed before the program guide mode, to determine the search sequence.

The sequence for searching for channels may not be determined according to adjacency. For example, channels may be searched for upward or downward based on the channel viewed before the program guide mode. However, considering response to the user, it is more proper that the channel search sequence be determined according to the adjacency between channels.

The channel search sequence may be changed by the search inclination of a user. For example, if a user manipulates the channel up/down button 430 referring to a screen shown in FIG. 4C, continuous search in a direction to be indicated later can be expected. Thus, when a channel up operation is indicated, the channel search operation may be limited to upper channels.

The channel search sequence can be determined referring to past viewing tendencies of users This determines the probability that a channel is to be tuned based on the accumulated frequency of channels tuned by a user. A channel having a higher probability is searched for earlier.

In a storing step S330, the obtained EPG information is stored in the memory unit 126. Here, the obtained program guide information can be renewed only when there is a difference between the obtained program guide information and program guide information stored in the memory unit 126.

The obtained EPG information is stored in the memory unit 126. Since the EPG information is transmitted by channels, the microprocessor 124 acquires EPG information of a corresponding channel whenever a channel is changed, and stores the acquired EPG information in the memory unit 126.

A program list is displayed, in step S340.

The microprocessor 124 accesses the program guide information stored in the memory unit 126 to generate the program list as shown in FIGS. 4A through 4C. The program list generated by the microprocessor 124 is displayed on a screen via the OSG mixer 118.

The program list is controlled according to a channel up/down command or page up/down command from a user, and when a channel selection command is applied by the user, the program of a selected channel is displayed, in step S350.

According to the program guiding method of the present invention, the longer it takes for a user to refer to the program list, the program guide information of more channels can be obtained. However, the program guide information of channels immediately required by a user can be sufficiently acquired even in a short searching time.

According to the method shown in FIG. 3, while a program is selected referring to the EPG information displayed by a user, accessible channels are scanned in a background operation unnoticeable to a user, thereby obtaining the EPG information. Also, the EPG information is obtained referring to the search direction of a user, thus accomplishing a smooth interface with the user.

Furthermore, in order to obtain the program guide information, the program guide information of a preferential channel is obtained first and provided to a user. Therefore, a user does not need to wait until the program guide information of all the channels is obtained, increasing convenience.

In the program guide method shown in FIG. 3, the program list as shown in FIG. 4C may be displayed in the display step S310. This is the case when a program list including a channel viewed before and channels adjacent to the channel is displayed in the initial stage of a program guiding operation.

According to an advanced television standard committee (ATSC) standard, the EPG information is recommended to be transmitted in a quantity of at least 8 hours to a maximum of 384 hours, at time intervals of 3 hours. Thus, erroneous program guide information is less likely to be displayed if a program guide command is performed within 384 hours at maximum.

Accordingly, it is all right to display the program list including a channel viewed before the program guide mode and several channels adjacent to the channel.

However, a program may be changed by the circumstances of a broadcasting station, or unstored program guide information may be requested. Thus, it is preferable that channels are searched for by the above-described searching method even after the program list including the channel viewed before the program guide mode and several channels adjacent to the channel is displayed, to again obtain a program guide.

Meanwhile, when the program list including the channel viewed before the program guide mode and several channels adjacent to that channel is displayed in the initial stage of the program guide operation, possible erroneous information of some channels can be replaced with correct information by searching for channels using the aforementioned search method.

Figure 5:
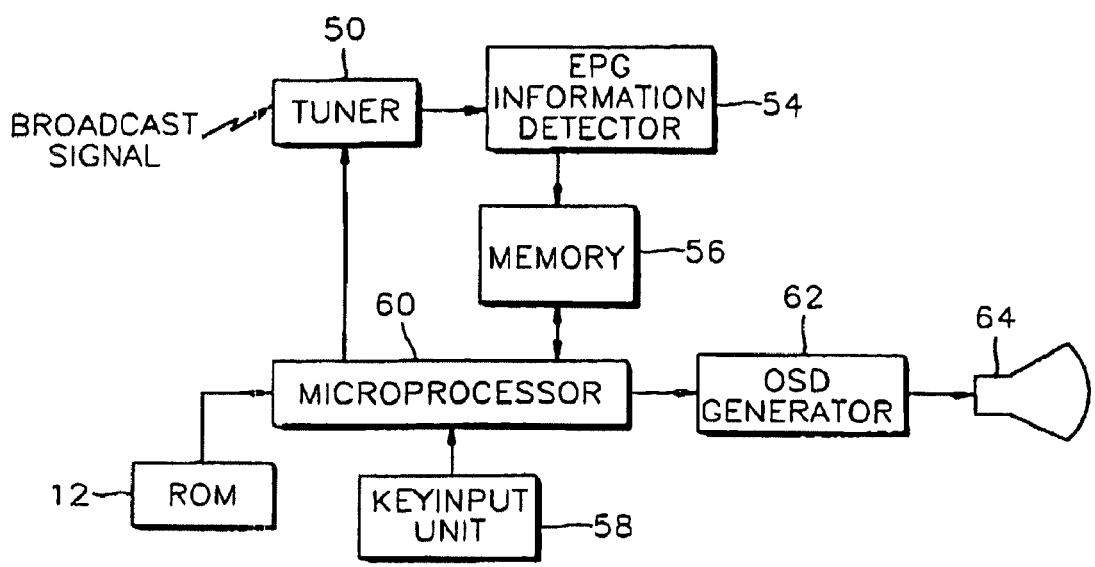
FIG. 5 is a block diagram illustrating an embodiment of a program guide apparatus according to the present invention.

FIG. 5 is a block diagram illustrating the configuration of a program guide apparatus according to the present invention. As shown in FIG. 5, the apparatus includes a tuner 50, a ROM 52, a program guide information detector 54, a memory 56, a key input unit 58, a microprocessor 60, and an OSD generator 62.

The tuner 50 is tuned to a broadcast signal of a tuned channel. The program guide information detector 54 detects EPG information from the broadcast signal of a channel tuned by the tuner 50. The detected EPG information is stored in the memory 56.

The microprocessor 60 writes a program list from the EPG information stored in the memory 56 according to a program stored in the ROM 52, and provides the program list to the OSD generator 62. The OSD generator 62 converts the program list written from the EPG information stored in the memory 56 into a character signal to display the program list to a CRT 64.

The microprocessor 60 controls tuning of the tuner 60 in the background operation while the program list is displayed on the CRT 64, i.e., while the viewer does not watch any broadcast program via the tuner, to obtain EPG information of accessible channels.

The microprocessor 60 searches for channels in a programmed channel searching sequence. This channel searching sequence depends on the sequence of channels which are displayed in the program guide mode.

When the channel up/down command is input via the key input unit 58 during channel search, the microprocessor 60 changes the channel searching sequence referring to the input channel up/down command.

When the EPG information is not stored in the memory 56, the microprocessor 60 generates a message of "please wait" or "acquiring guide information". When at least a current channel and current program guide information are obtained, the microprocessor 60 generates a program list corresponding to the stored program guide information.

Figure 6:
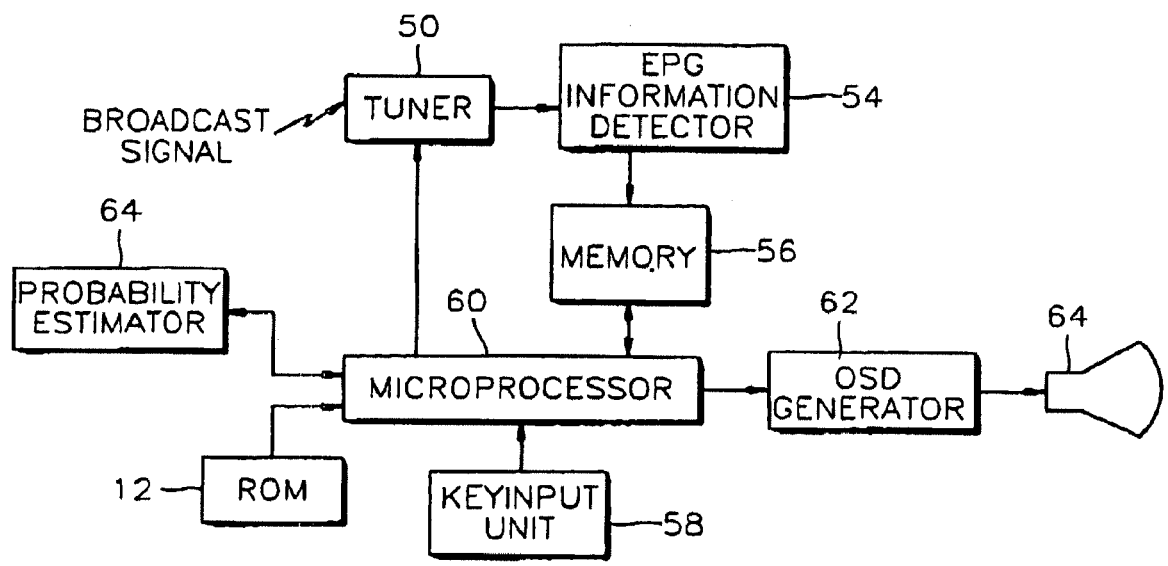
FIG. 6 is a block diagram illustrating another embodiment of a program guide apparatus according to the present invention.

FIG. 6 is a block diagram illustrating another embodiment of a program guide apparatus according to the present invention. Units shown in FIG. 6 performing the same operations as those in FIG. 5 are referred to by the same reference numerals, and will not be described again. The apparatus of FIG. 6 further comprises a probability estimator 64 in addition to the components of the apparatus of FIG. 5.

The probability estimator 64 accumulates the number of times channels are tuned by a user, and calculates the probability that each channel will be tuned, according to the accumulated value. It can be estimated that the probability of tuning is high as a channel is tuned more often.

The microprocessor 124 determines the order of priority of channel search according to the probability calculated by the probability estimator 64.

In the program guide information acquiring method according to the present invention as described above, while a viewer does not watch the program of any channel tuned in a tuner, program guide information of accessible channels is obtained in a background operation. Therefore, the program guide information of the accessible channels can be obtained by only a single tuner.

Furthermore, in the program guide method and apparatus according to the present invention, information immediately required by a user is obtained first, and information of less preferential channels is obtained next, thus smoothing the interface with the user.

What is claimed is:

1. A method of channel searching, comprising:
    extracting additional information from a transport stream for audio and video information, with the additional information including Program Specific Information (PSI) table data conforming with an MPEG standard and information transmitted according to an advanced television standard committee (ATSC) standard;
    generating a channel list based on the additional information, where the channel list is made up of one or more grouped plural channel numbers, such that each channel number of a respective grouping of channel numbers is identified by a two-part channel number having a same main channel number, as a first numeral part of each two-part channel number, and one or more distinct respective sub-channel numbers, as respective second numeral parts of each two-part channel number, and where each of the one or more grouped plural channel numbers are represented by two-part channel numbers having respectively different main channel numbers; and
    providing a user interface to allow a user to navigate the channel list to search a two-part channel number,
    wherein the generating of the channel list comprises incrementally providing program information from the additional information through the user interface by respectively updating the channel list as different program information for different two-part channel numbers is obtained from the transport stream, including respectively incrementally providing respective program information based upon determined proximities between one or more two-part channel numbers in a first channel list and additional two-part channel numbers whose program information is to be subsequently provided through the user interface with the one or more two-part channel numbers in the first channel list upon an updating of the first channel list.

2. The method of claim 1, wherein a listing sequence can be determined based on proximity between main channel numbers to allow a main channel number to be listed with at least one upper numerically close main channel number or at least one lower numerically close main channel number.

3. The method of claim 1, wherein the two-part channel numbers are displayed in the channel list such that a sub-channel number is displayed after a respective main channel number.

4. The method of claim 1, wherein the transport stream includes the audio, video, and additional information for each of plural programs included in the transport stream, with the additional information including respective program specific information (PSI) tables, conforming with the MPEG standard, and respective program guide information of the plural programs, and
wherein the extracting includes separately extracting the respective program guide information from the received transport stream.

5. The method of claim 1, wherein a sequence of acquiring up to date program information from the transport stream for the displayed channel list for respective channel groupings is determined based on respective channel number proximities between two-part channel numbers of a current channel grouping and respective two-part channel numbers of channel groupings to be displayed above and/or below the two-part channel numbers of the current channel grouping.

6. The method of claim 5, wherein the sequence of displaying the up to date program information in the channel list for respective channel groupings is determined based on proximity between two-part channel numbers to allow up to date first program guide information of the current channel grouping to be displayed along with at least up to date second program guide information of a proximally related upper close grouping of related two-part channel numbers and/or at least up to date third program guide information of a proximally related lower close grouping of related two-part channel numbers, such that the acquiring of the up to date second and/or third program guide information for availability in the displaying of the up to date program guide information in the channel list occurs prior to acquiring up-to-date program guide information of channel groupings corresponding to two-part channel numbers of greater distances from the selected current first two-part channel number than the respective related two-part channel numbers of the upper close grouping or the lower close grouping.

7. The method of claim 1, wherein a program according to the MPEG standard is distinguished from a predetermined corresponding two-part channel number and either of the first and second parts of the predetermined corresponding two-part channel number.

8. The method of claim 1, wherein, in the generating of the channel list, the first channel list is generated based on first program information for a first two-part channel number obtained from the transport stream and other displayable channel lists are generated as respective program information for other two-part channel numbers is obtained from the transport stream so respective channel lists can be sequentially displayed, along with the first program information, based upon prioritized sequencing of the obtaining of the respective program information, with the prioritization being based upon determined proximities between the first two-part channel number and the other two-part channel numbers, respectively.

9. A method of channel searching, comprising:
converting an IF signal from a tuner of the a receiver into a baseband signal;
channel decoding the baseband signal to reconstruct a transport stream which includes audio, video, and additional information;
extracting the additional information from the reconstructed transport stream, with the additional information including Program Specific Information (PSI) table data conforming with an MPEG standard and information transmitted according to an advanced television standard committee (ATSC) standard;
storing the extracted additional information in a storage; and
accessing the storage to generate a channel list based on the stored additional information, where the channel list is made up of one or more grouped plural channel numbers, such that each channel number of a respective grouping of channel numbers is identified by a two-part channel number having a same main channel number, as a first numeral part of each two-part channel number, and one or more distinct respective sub-channel numbers, as respective second numeral parts of each two-part channel number, and where each of the one or more grouped plural channel numbers are represented by two-part channel numbers having respectively different main channel numbers; and
providing a user interface to allow a user to navigate the channel list to search a two-part channel number,
wherein the generating of the channel list comprises incrementally providing program information from the additional information through the user interface by respectively updating the channel list as different program information for different two-part channel numbers is obtained from the transport stream, including respectively incrementally providing respective program information based upon determined proximities between one or more two-part channel numbers in a first channel list and additional two-part channel numbers whose program information is to be subsequently provided through the user interface with the one or more two-part channel numbers in the first channel list upon an updating of the first channel list.

10. A method of channel searching comprising:
receiving a digital television transport stream which includes audio, video, and additional information;
extracting the additional information from the received transport stream, with the additional information including Program Specific Information (PSI) table data conforming with an MPEG standard and information transmitted according to an advanced television standard committee (ATSC) standard;
storing the extracted additional information in a storage;
accessing the storage to generate a channel list based on the stored additional information, where the channel list is made up of one or more grouped plural channel numbers, such that each channel number of a respective grouping of channel numbers is identified by a two-part channel number having a same main channel number, as a first numeral part of each two-part channel number, and one or more distinct respective sub-channel numbers, as respective second numeral parts of each two-part channel number, and where each of the one or more grouped plural channel numbers are represented by two-part channel numbers having respectively different main channel numbers; and providing a user interface to allow a user to navigate the channel list to search a two-part channel number, wherein the generating of the channel list comprises incrementally providing program information from the additional information through the user interface by respectively updating the channel list as different program information for different two-part channel numbers is obtained from the transport stream, including respectively incrementally providing respective program information based upon determined proximities between one or more two-part channel numbers in a first channel list and additional two-part channel numbers whose program information is to be subsequently provided through the user interface with the one or more two-part channel numbers in the first channel list upon an updating of the first channel list.

* * * * *

UNITED STATES PATENT AND TRADEMARK OFFICE
CERTIFICATE OF CORRECTION

PATENT NO. : 8,347,331 B2
APPLICATION NO. : 12/822878
DATED : January 1, 2013
INVENTOR(S) : Ju-ha Park Page 1 of 1

It is certified that error appears in the above-identified patent and that said Letters Patent is hereby corrected as shown below:

In the Claims

In Col. 10, Line 6, In Claim 9, delete "the-a" and insert -- a --, therefor.

In Col. 10, Line 48, In Claim 10, delete "searching" and insert -- searching, --, therefor.

Signed and Sealed this
Twenty-ninth Day of October, 2013

Teresa Stanek Rea
*Deputy Director of the United States Patent and Trademark Office*